US011919479B2

United States Patent
Safir et al.

(10) Patent No.: US 11,919,479 B2
(45) Date of Patent: Mar. 5, 2024

(54) SYSTEMS AND METHODS FOR PROVIDING SECURITY TO A VEHICLE

(71) Applicant: Ford Global Technologies, LLC, Dearborn, MI (US)

(72) Inventors: Tarik Safir, Chesterfield (GB); Sam Harris, Billericay (GB); Jamie Mahmutyazicioglu, Chelmsford (GB); Jonathan Hannaford, Loughton (GB); Endre Hanak, Colchester (GB)

(73) Assignee: Ford Global Technologies, LLC, Dearborn, MI (US)

( * ) Notice: Subject to any disclaimer, the term of this patent is extended or adjusted under 35 U.S.C. 154(b) by 459 days.

(21) Appl. No.: 17/323,832

(22) Filed: May 18, 2021

(65) Prior Publication Data

US 2022/0371545 A1 Nov. 24, 2022

(51) Int. Cl.
*B60R 25/31* (2013.01)
*B60R 25/10* (2013.01)
*B60R 25/102* (2013.01)
*B60R 25/30* (2013.01)

(52) U.S. Cl.
CPC ............ *B60R 25/31* (2013.01); *B60R 25/102* (2013.01); *B60R 25/305* (2013.01); *B60R 2025/1016* (2013.01); *B60R 2325/205* (2013.01)

(58) Field of Classification Search
CPC ..... B60R 25/102; B60R 25/31; B60R 25/018; B60R 25/18; B60R 25/245; B60R 2025/1016; B60R 2325/205; G01S 13/931; G01S 13/04; G01S 2013/9316
USPC ......... 342/167, 457; 340/425.5, 426.1, 539.1
See application file for complete search history.

(56) References Cited

U.S. PATENT DOCUMENTS

| 7,492,303 | B1 | 2/2009 | Levitan et al. |
| 8,461,989 | B2* | 6/2013 | Romero ................. G01S 13/04 340/552 |
| 9,030,321 | B2 | 5/2015 | Breed |
| 9,041,545 | B2* | 5/2015 | Zelepugas ............... G01S 17/86 381/104 |
| 9,802,571 | B2* | 10/2017 | Shreve .................. B60R 25/102 |
| 9,971,028 | B2* | 5/2018 | Park ...................... G01S 13/345 |
| 10,139,827 | B2 | 11/2018 | Charette et al. |
| 10,417,911 | B2* | 9/2019 | Herman ............... G08G 1/0112 |
| 10,713,839 | B1* | 7/2020 | Summers ............... G06T 7/001 |
| 10,983,193 | B2* | 4/2021 | Lin ......................... H01Q 3/267 |
| 11,049,233 | B2* | 6/2021 | Kumar ................. H04N 23/698 |
| 11,087,138 | B2* | 8/2021 | Guo ....................... G06V 20/46 |

(Continued)

FOREIGN PATENT DOCUMENTS

| CN | 108594264 A | * 9/2018 | ............ G01S 17/06 |
| CN | 111497773 A |   8/2020 | |
| CN | 112505142 A | * 3/2021 | ............ G01B 17/02 |

OTHER PUBLICATIONS

A. Kanno "IMU-Enabled Nondestructive Imaging System Based on Millimeter-Wave Radar" (Oct. 2019).

*Primary Examiner* — Vladimir Magloire
*Assistant Examiner* — Michael W Justice
(74) *Attorney, Agent, or Firm* — Brandon Hicks; Eversheds Sutherland (US) LLP

(57) ABSTRACT

The systems and methods disclosed herein are configured to provide security to a vehicle. A system includes a point measurement device inside a space of a vehicle. The system identifies a threat if points that differ from a calibrated set of points are localized in an area of the space.

19 Claims, 4 Drawing Sheets

(56) References Cited

U.S. PATENT DOCUMENTS

| | | | | |
|---|---|---|---|---|
| 11,460,573 | B2* | 10/2022 | Ikefuji | G01S 13/9023 |
| 2010/0141443 | A1* | 6/2010 | Romero | G08B 29/20 |
| | | | | 340/552 |
| 2012/0280824 | A1* | 11/2012 | Zelepugas | G01S 17/86 |
| | | | | 73/632 |
| 2016/0096506 | A1* | 4/2016 | Shreve | B60R 25/102 |
| | | | | 348/148 |
| 2019/0178983 | A1* | 6/2019 | Lin | G01S 7/4021 |
| 2019/0189007 | A1* | 6/2019 | Herman | G08G 1/0133 |
| 2020/0226734 | A1* | 7/2020 | Kumar | G07C 5/10 |
| 2020/0334467 | A1* | 10/2020 | Guo | G06F 18/00 |
| 2021/0072376 | A1* | 3/2021 | Ikefuji | G01S 13/003 |
| 2022/0388464 | A1* | 12/2022 | Roberts | B60R 21/01554 |
| 2022/0388524 | A1* | 12/2022 | Roberts | G01S 13/04 |
| 2023/0168364 | A1* | 6/2023 | Podkamien | G01S 13/89 |
| | | | | 701/45 |

\* cited by examiner

SYSTEMS AND METHODS FOR PROVIDING SECURITY TO A VEHICLE

BACKGROUND

Equipment in vehicles, such as commercial vehicles, is a target for theft. Attacks on vehicles may be carried out in an organized way and follow a set process for breaking into a vehicle. The process may include steps such as attacking the body panels with tools or by peeling the body panels back at perceived weak points. It is with respect to these and other considerations that the disclosure made herein is presented.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to provide security to a vehicle. The system includes a point measurement device inside a space of a vehicle. The system identifies a threat if points that differ from a calibrated set of points are localized in an area of the space.

Figure 1:
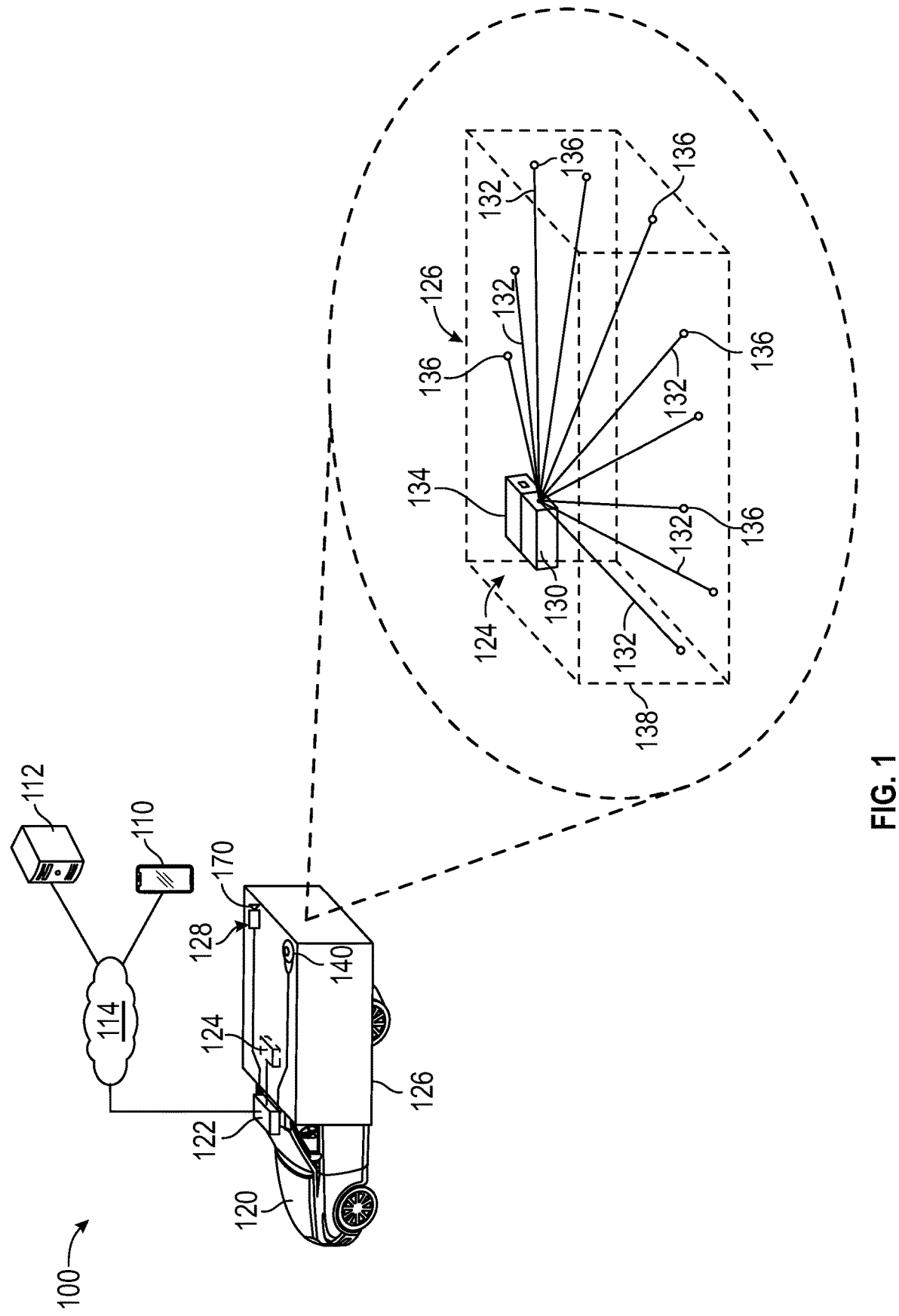
FIG. 1 depicts a system for providing security to a vehicle in accordance with the present disclosure.

Referring to FIG. 1, a system 100 includes a mobile device 110, a server 112, and a vehicle 120 that are connected by a network 114. The vehicle 120 includes a vehicle computer 122, a point measurement device 124, and a computer vision system 128.

The point measurement device may be a Frequency Modulated Continuous Wave (FMCW) radar 124. The FMCW radar 124 is located in an interior space 126 of the vehicle 120. The interior space 126 may be a load space (e.g., equipment storage or a trunk space) of the vehicle 120.

The FMCW radar 124 may include a transmitter 130 (e.g., a transmit (TX) antennae) that transmits a beam 132 including a band of frequencies (e.g., a chirp) at an angle, and a receiver 134 (e.g., a receive (RX) antennae) that receives the reflected beam 132.

The FMCW radar 124 generates a point cloud (e.g., points 136). If the load space 126 is closed, the point cloud (e.g., points 136) represents the interior surface of the load space 126 (e.g., presence detection).

To generate the point cloud (e.g., points 136), the difference in time between when the beam 132 is transmitted and when the beam 132 is received may be determined. The difference in time and a frequency of the beam 132 can be used to determine a distance to a point 136 on the interior surface of the load space 126. Using the distance to the point 136 and an angle of the beam 132, (x, y) coordinates of the point 136 on a coordinate system can be determined (e.g., localization). Accordingly, a set of points 136 that cover the interior surface of the load space 126 can be determined.

The FMCW radar 124 determines points 136 on the interior of the load space 126, for example, as a security measure to recognize when the load space 126 is damaged or breached.

In some cases, the system 100 may be dormant and wake up based on a sound or vibration measurement. For example, system 100 may include a sensor array 140 including an accelerometer and/or a microphone to measure a sound or vibration. The vehicle computer 122 may initiate measurements with the FMCW radar 124 if the sound or vibration measurement exceeds a certain threshold.

Figure 3:
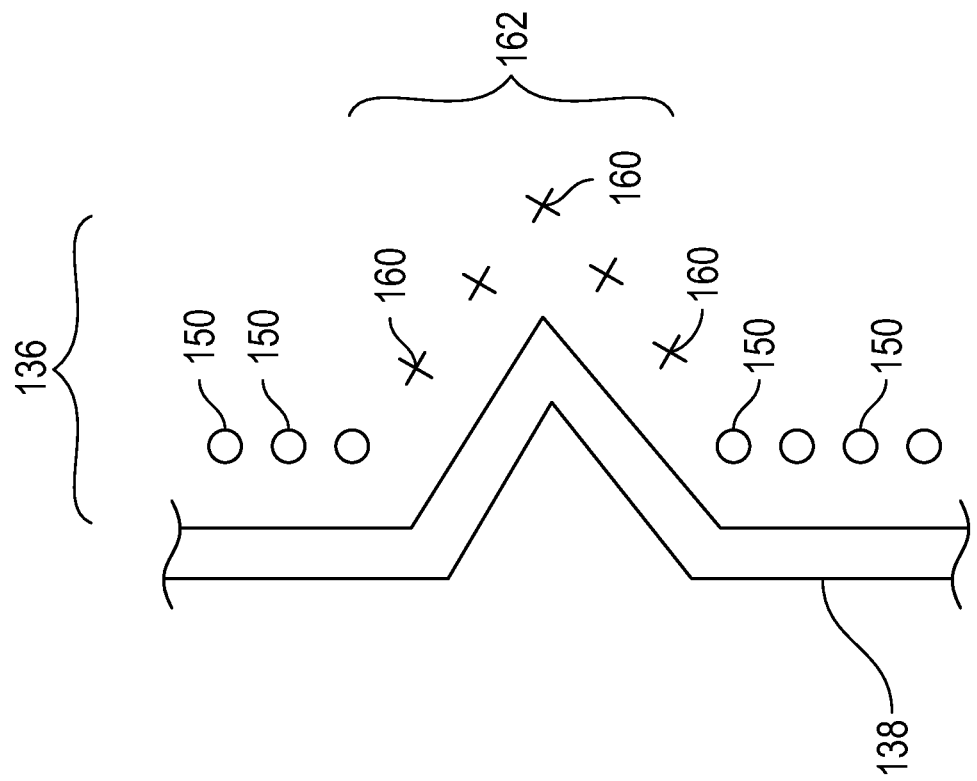
FIG. 3 depicts a damaged version of the wall of FIG. 2 in accordance with the present disclosure.
Figure 2:
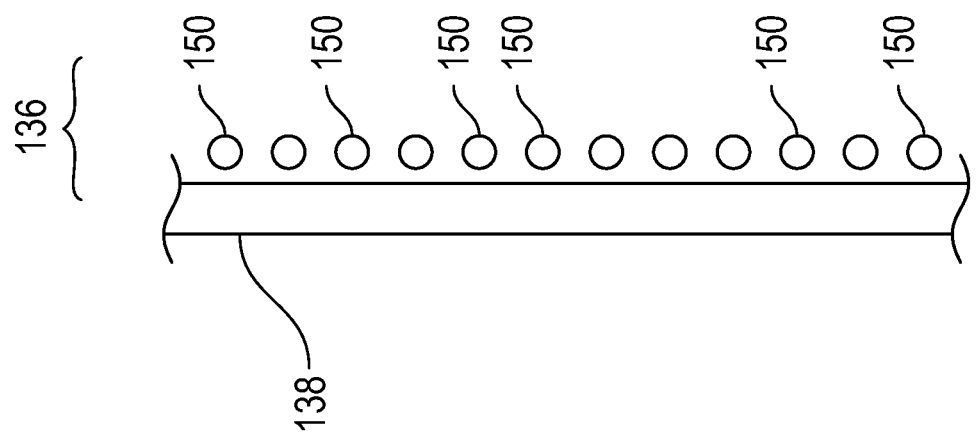
FIG. 2 depicts a wall of a space of a vehicle in accordance with the present disclosure.

Referring to FIGS. 2 and 3, for purposes of teaching, part of a wall 138 of the load space 126 is illustrated. The wall 138 may include a panel of the vehicle 120.

The FMCW radar 124 may be calibrated by determining a set of points 136 on the interior of the load space 126 that includes static reference points 150. The step of determining static reference points 150 may be repeated until all points are determined to be static.

For example, if a point 136 is determined to be at the same location (e.g., same distance at same angle) at two different times, the point 136 is a static reference point 150. The calibration provides a set of static reference points 150 as a basis for measurement of dynamic points.

As the load space 126 of the vehicle 120 may have several items or contents occupying it at any given time, the static reference points 150 may also represent static items in the load space 126.

To determine whether to notify a user or mobile device 110 of access or damage to the load space 126, the system 100 determines if a set of points 136 includes dynamic points 160. Referring to FIGS. 2 and 3, FIG. 2 illustrates static reference points 150 on an undamaged wall 138 (e.g., a side elevational view) and FIG. 3 illustrates static reference points 150 and dynamic points 160 on a damaged wall 138. For the damaged wall 138 in FIG. 3, the set of points 136 includes static reference points 150 on the undamaged portion of the wall 138 and dynamic points 160 on the damaged portion of the wall 138.

Dynamic points 160 are points 136 that differ from the static reference points 150 (e.g., the FMCW radar 124 determines a point 136 that has a different distance at the same angle as a static reference point 150).

According to an exemplary method, after calibration, the FMCW radar 124 determines locations of a number of points 136 and determines if any of the points 136 are dynamic points 160. The system 100 ignores the points 136 that are static reference points 150 and focuses on the points 136 that are dynamic points 160 (e.g, that differ from the static reference points 150).

The system 100 then determines if the dynamic points 160 are in a localized area. For example, the system 100 may determine if the dynamic points 160 are close together (e.g., a certain number of dynamic points 160 within a threshold distance of one another, for example, 1-10 cm).

If the dynamic points 160 are not close together, the dynamic points 160 are not localized and the system 100 returns to the step of determining the location of points 136.

If the dynamic points 160 are close together, a cluster 162 is created from the dynamic points 160. The cluster 162 of dynamic points 160 may be indicative of localized deformation of the wall 138 (e.g., body panels) and may thereby be differentiated from other less localized damage caused by, for example, weather. In particular, weather damage may be inflicted along an entire body panel as opposed to a localized area and the magnitude of the damage may be lower.

The system 100 then determines if the cluster 162 has been previously identified. If the cluster 162 has not been previously identified, the cluster 162 is assigned an identifier.

The system 100 may continue to determine points 136. If the next set of dynamic points 160 are the same as those of the previously identified cluster 162 or are near those of the previously identified cluster 162 (e.g., indicating additional damage to the wall 138), which has been previously identified, the next set of dynamic points 160 is added to the previous set of dynamic points 160 or may replace the previous set of dynamic points 160 to track the cluster 162 over time. Alternatively, a new cluster may be identified.

The identified cluster 162 is an indicator of a threat or suspicious activity. In particular, the cluster 162 of dynamic points 160 can represent deformation of the wall 138 (e.g. body panels), an intrusion into the load space 126 (e.g., a person entering the load space 126 without deformation of the body panels), and/or another suspicious event that the system 100 will detect. An attack on the load space 126 may deform the body panels, pierce or cut the body panels, pull the body panels back, combinations thereof, or the like.

The identified cluster 162 initiates an object detection method by the computer vision system 128. The computer vision system 128 may include a camera 170 and object recognition algorithms that detect and track objects from image data. For example, the computer vision system 128 may capture an image with the camera 170 and identify an object (e.g., a person and/or tool) in the image to verify that the identified cluster 162 represents a threat or suspicious activity.

If the threat or suspicious activity is verified, the system 100 may notify a user on the mobile device 110 or notify the server 112. Accordingly, the system 100 detects an exterior interaction with the vehicle 120 using interior sensors (the FMCW radar 124). The interior sensors may not be easily tampered with or disabled as accessing the sensors through the load space 126 causes the system 100 to notify a user before the sensors can be accessed. The vehicle 120 is aware of a potential attack earlier than it would be using traditional vehicle security methods.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

Referring to FIG. 1, the system 100 includes the mobile device 110, the server 112, and the vehicle 120 that are connected by the network 114.

The vehicle 120 may take the form of a passenger or commercial automobile such as, for example, a truck, a car, a sport utility vehicle, a crossover vehicle, a van, a minivan, a taxi, a bus, etc., and may be configured to include various types of automotive drive systems. Example drive systems can include various types of internal combustion engine (ICE) powertrains having a gasoline, diesel, or natural gas-powered combustion engine with conventional drive components such as, a transmission, a drive shaft, a differential, etc.

In another configuration, the vehicle 120 may be configured as an electric vehicle (EV). More particularly, the vehicle 120 may include a battery EV (BEV) drive system. The vehicle 120 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 120 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 120 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5.

In some cases, the system 100 may be dormant and wake up based on a sound or vibration measurement. For example, system 100 includes the sensor array 140 including an accelerometer and/or a microphone to measure a sound or vibration. The vehicle computer 122 may initiate measurements with the FMCW radar 124 if the sound or vibration measurement exceeds a certain threshold.

The vehicle includes the point measurement device 124 such as a Frequency Modulated Continuous Wave (FMCW) radar 124. The FMCW radar 124 is located in the interior space 126 of the vehicle 120. The interior space 126 may be a load space (e.g., a trunk space) of the vehicle 120.

The FMCW radar 124 includes the transmitter 130 (e.g., a transmit (TX) antennae) that transmits a beam 132 including a band of frequencies (e.g., a chirp) at an angle, and the receiver 134 (e.g., a receive (RX) antennae) that receives a reflected beam 132.

The FMCW radar 124 generates a point cloud (e.g., points 136). If the load space 126 is closed, the point cloud (e.g., points 136) represents the interior surface of the load space 126 (e.g., presence detection) or static objects in the load space 126.

To generate the point cloud (e.g., points 136), the difference in time between when the beam 132 is transmitted and when the beam 132 is received may be determined. The difference in time and a frequency of the beam 132 can be used to determine a distance to a point 136 on the interior surface of the load space 126. Using the distance to the point 136 and an angle of the beam 132, (x, y) coordinates of the point 136 on a coordinate system can be determined (e.g., localization). Accordingly, a set of points 136 that cover the interior surface of the load space 126 or static object in the load space 126 can be determined.

The FMCW radar 124 determines points 136 on the interior of the load space 126, for example, as a security measure to recognize when the load space 126 is damaged or breached.

The FMCW radar 124 may be calibrated by determining a set of points 136 on the interior (e.g., wall 138 or objects such as equipment) of the load space 126 that includes static reference points 150. The step of determining static reference points 150 may be repeated until all points are determined to be static.

For example, if a point 136 is determined to be at the same location (e.g., same distance at same angle) at two different times, the point 136 is a static reference point 150. The calibration provides a set of static reference points 150 as a basis for measurement of dynamic points 160.

To determine whether to notify a user or mobile device 110 of access or damage to the load space 126, the system 100 determines if a set of points 136 includes dynamic points 160. Referring to FIGS. 2 and 3, FIG. 2 illustrates static reference points 150 on an undamaged wall 138 (e.g., a side elevational view) and FIG. 3 illustrates static reference points 150 and dynamic points 160 on a damaged wall 138. For the damaged wall 138, the set of points 136 includes static reference points 150 on the undamaged portion of the wall 138 and dynamic points 160 on the damaged portion of the wall 138.

Dynamic points 160 are points that are different from the static reference points 150 (e.g., the FMCW radar 124 determines a point 136 that has a different distance at the same angle as a static reference point 150).

The vehicle 120 includes the computer vision system 128. The computer vision system 128 includes the camera 170 and an object detection module to perform object localization and image classification functions on an image from the camera 170.

Object detection may be performed using a variety of methods for determining bounding boxes. For example, the object detection may use Convolutional Neural Networks (CNN), Region-Based Convolutional Neural Networks (RCNN), fast RCNN, faster RCNN, you only look once (YOLO), and the like.

The object detection module uses object localization algorithms and image classification algorithms. The object localization algorithm locates the presence of objects in the image and indicates the presence of the object with a bounding box. For example, the location of each bounding box is defined by a point and each bounding box has a width and a height. The image classification algorithm predicts the type or class (e.g., people or luggage) of the object in the bounding box.

Figure 4:
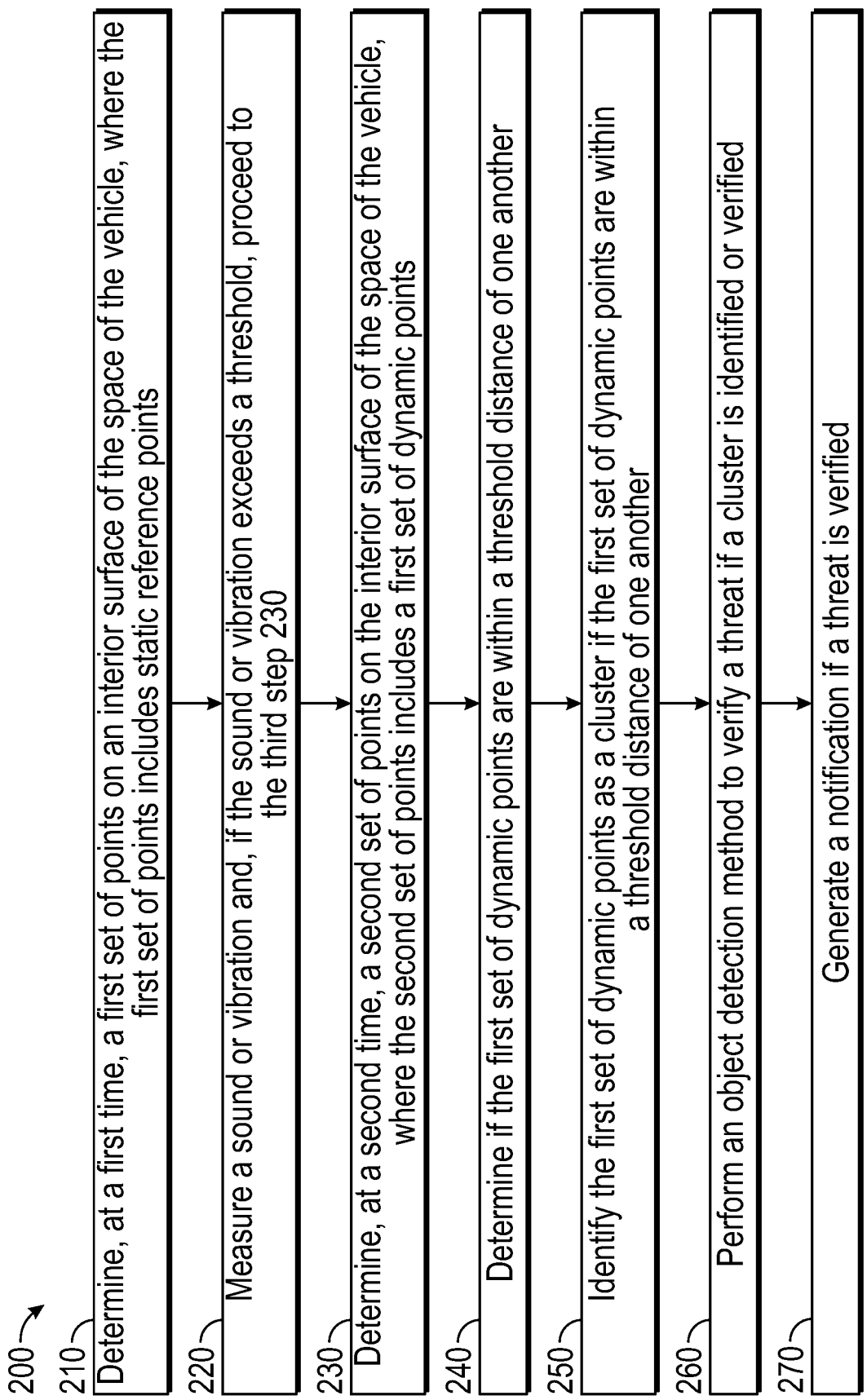
FIG. 4 depicts a method in accordance with the present disclosure.

Referring to FIG. 4, according to a first step 210 of an exemplary method 200, the FMCW radar 124 determines, at a first time, a first set of points 136 on an interior surface of the space 126 of the vehicle 120. The first set of points 136 includes static reference points 150. The first set of points 136 may be repeatedly determined until all of the first set of points 136 are static reference points 150.

According to a second step 220, the sensor array 140 measures a sound or vibration and, if the sound or vibration exceeds a threshold, the method 200 proceeds to the third step 230.

According to a third step 230, the FMCW radar 124 determines, at a second time, a second set of points 136 on an interior surface of the space 126 of the vehicle 120. The second set of points 136 includes a first set of dynamic points 160.

According to a fourth step 240, the vehicle computer 122 determines if the first set of dynamic points 160 are within a threshold distance of one another.

According to a fifth step 250, if the first set of dynamic points 160 are within a threshold distance of one another, the vehicle computer 122 identifies the first set of dynamic points 160 as a cluster 162.

According to a sixth step 260, once a cluster 162 is identified or verified (e.g., through repeating steps 230, 240, 250), the computer vision system 128 performs an object detection method.

According to a seventh step 270, the system 100 generates a notification if a threat is verified by the object detection method (e.g., if an object is detected and identified as a threat.) The notification may be sent to the mobile device 110 or the server 112.

Figure 5:
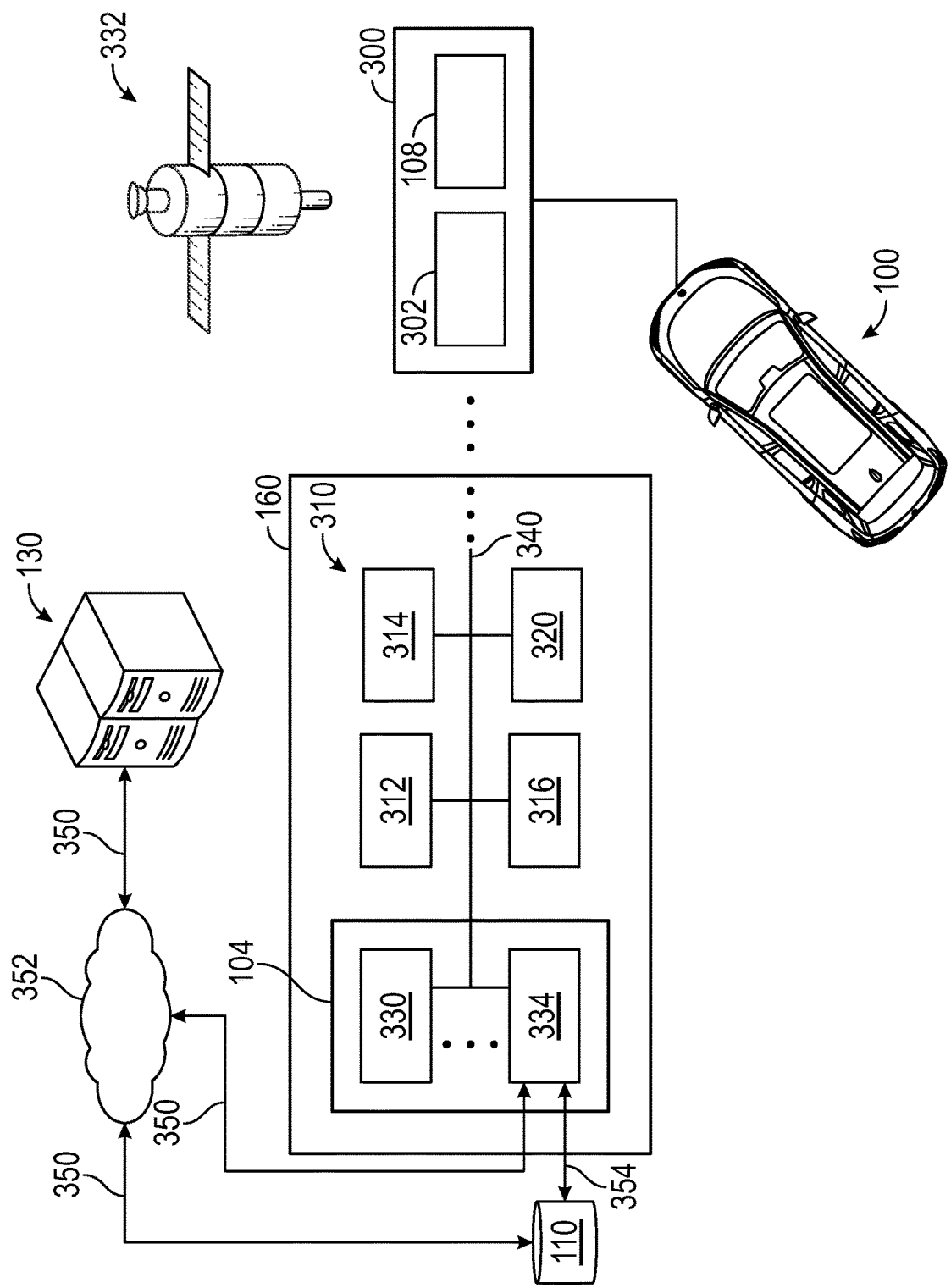
FIG. 5 depicts the system of FIG. 1 in accordance with the present disclosure.

Referring to FIG. 5, the system 100 is described in greater detail.

The vehicle computer 122 includes components including a memory (e.g., memory 300) and a processor (e.g., a processor 302). The mobile device 110 and the server 112 also include a memory and processor. For purposes of teaching, the descriptions of the memory 300 and processor 302 are applicable to the memory and processor of the other elements.

A processor may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs).

A memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

Memory is computer readable media on which one or more sets of instructions, such as the software for performing the methods of the present disclosure, can be embedded. The instructions may embody one or more of the methods or logic as described herein. The instructions may reside completely, or at least partially, within any one or more of the memory, the computer readable medium, and/or within the processor during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Continuing with FIG. 5, a vehicle control unit (VCU) 304 includes a plurality of electronic control units (ECUs) 310 disposed in communication with the vehicle computer 122. The VCU 304 may coordinate the data between vehicle systems, connected servers (e.g., server 112), and other vehicles operating as part of a vehicle fleet. The VCU 304 may control aspects of the connected vehicle 120, and implement one or more instruction sets received from a vehicle system controller (such as vehicle computer 122).

The VCU 304 can include or communicate with any combination of the ECUs 310, such as, for example, a Body Control Module (BCM) 312, an Engine Control Module (ECM) 314, a Transmission Control Module (TCM) 316, the Telematics Control Unit 318 (TCU), a Restraint Control Module (RCM) 320, and the like. The TCU 318 may be disposed in communication with the ECUs 310 by way of a Controller Area Network (CAN) bus 340. In some aspects, the TCU 318 may retrieve data and send data as a CAN bus 340 node.

The CAN bus 340 may be configured as a multi-master serial bus standard for connecting two or more of the ECUs 310 as nodes using a message-based protocol that can be configured and/or programmed to allow the ECUs 310 to communicate with each other. The CAN bus 340 may be or include a high-speed CAN (which may have bit speeds up to 1 Mb/s on CAN, 5 Mb/s on CAN Flexible Data Rate (CAN FD), and can include a low-speed or fault tolerant CAN (up to 125 Kbps), which may, in some configurations, use a linear bus configuration. In some aspects, the ECUs 310 may communicate with a host computer (e.g., the vehicle computer 122, and/or server(s) 112 etc.), and may also communicate with one another without the necessity of a host computer.

The CAN bus 340 may connect the ECUs 310 with the vehicle computer 122 such that the vehicle computer 122 may retrieve information from, send information to, and otherwise interact with the ECUs 310 to perform steps described according to embodiments of the present disclosure. The CAN bus 340 may connect CAN bus nodes (e.g., the ECUs 310) to each other through a two-wire bus, which may be a twisted pair having a nominal characteristic impedance. The CAN bus 340 may also be accomplished using other communication protocol solutions, such as Media Oriented Systems Transport (MOST) or Ethernet. In other aspects, the CAN bus 340 may be a wireless intra-vehicle CAN bus.

The VCU 304 may control various loads directly via the CAN bus 340 communication or implement such control in conjunction with the BCM 312. The ECUs 310 described with respect to the VCU 304 are provided for exemplary purposes only, and are not intended to be limiting or exclusive. Control and/or communication with other control modules is possible, and such control is contemplated.

The ECUs 310 may control aspects of vehicle operation and communication using inputs from human drivers, inputs from a vehicle system controller, and/or via wireless signal inputs received via wireless channel(s) from other connected devices. The ECUs 310, when configured as nodes in the CAN bus 340, may each include a central processing unit (CPU), a CAN controller, and/or a transceiver.

The TCU 318 can be configured to provide vehicle connectivity to wireless computing systems onboard and offboard the vehicle 120 and is configurable for wireless communication between the vehicle 120 and other systems, computers, mobile devices 110, servers 112, and modules.

The TCU 318 includes a Navigation (NAV) system 330 for receiving and processing a GPS signal from a GPS 332, a Bluetooth® Low-Energy Module (BLEM) 334, a Wi-Fi transceiver, an Ultra-Wide Band (UWB) transceiver, and/or other wireless transceivers described in further detail below for using near field communication (NFC) protocols, Bluetooth® protocols, Wi-Fi, Ultra-Wide Band (UWB), and other possible data connection and sharing techniques.

The TCU 318 may include wireless transmission and communication hardware that may be disposed in communication with one or more transceivers associated with telecommunications towers and other wireless telecommunications infrastructure. For example, the BLEM 334 may be configured and/or programmed to receive messages from, and transmit messages to, one or more cellular towers associated with a telecommunication provider, and/or and a Telematics Service Delivery Network (SDN) associated with the vehicle 120 for coordinating vehicle fleet.

The BLEM 334 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 334 may include Generic Attribute Profile (GATT) device connectivity for client devices that respond to or initiate GATT commands and requests.

External servers 112, may be communicatively coupled with the vehicle 120 via one or more network(s) 114, which may communicate via one or more wireless channel(s) 350. The wireless channel(s) 350 are depicted in FIG. 5 as communicating via the one or more network(s) 114.

The mobile device 110 may be connected via direct communication (e.g., channel 354) with the vehicle 120 using near field communication (NFC) protocols, Bluetooth® protocols, Wi-Fi, Ultra-Wide Band (UWB), and other possible data connection and sharing techniques.

The network(s) 114 illustrate example communication infrastructure in which the connected devices discussed in various embodiments of this disclosure may communicate. The network(s) 114 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, WiMAX (IEEE 802.16m), Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), Universal Mobile Telecommunications System (UMTS), Long Term Evolution (LTE), and the like.

The BCM 312 generally includes an integration of sensors, vehicle performance indicators, and variable reactors associated with vehicle systems, and may include processor-based power distribution circuitry that can control functions associated with the vehicle body such as lights, windows, security, the point measurement device 124, the computer vision system 128, the sensor array 140, and various comfort controls. The BCM 312 may also operate as a gateway for bus and network interfaces to interact with remote ECUs.

The BCM 312 may coordinate any one or more functions from a wide range of vehicle functionality, including energy management systems, alarms, vehicle immobilizers, driver and rider access authorization systems, Phone-as-a-Key (PaaK) systems, driver assistance systems, Autonomous Vehicle (AV) control systems, power windows, doors, actuators, and other functionality, etc.

The BCM 312 may be configured for vehicle energy management, exterior lighting control, wiper functionality, power window and door functionality, heating ventilation and air conditioning systems, and driver integration systems. In other aspects, the BCM 312 may control auxiliary equipment functionality, and/or is responsible for integration of such functionality. In one aspect, a vehicle having a vehicle control system may integrate the system using, at least in part, the BCM 312.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   determining, at a first time, a first set of points on an interior surface of a load space of a vehicle with a radar of the vehicle which is disposed in the load space, wherein the radar generates a point cloud representing the interior surface of the load space, wherein the first set of points includes static reference points;
   determining, at a second time, a second set of points on the interior surface of the load space of the vehicle with the radar, wherein the second set of points includes a first set of dynamic points that are determined with respect to the static reference points; and
   identifying, based on the first set of dynamic points being within a threshold distance of one another, the first set of dynamic points as a cluster, thereby indicating an intrusion into the load space without deformation of any body panels of the vehicle.

2. The method of claim 1, wherein the radar includes a transmitter and a receiver.

3. The method of claim 2, wherein the transmitter transmits a beam with a band of frequencies at an angle and the receiver receives a reflected beam.

4. The method of claim 3, wherein a point location includes an angle and a distance, and a first dynamic point has a same angle as a first static reference point and a different distance than the first static reference point.

5. The method of claim 3, wherein the transmitter transmits beams at different angles and the radar determines a distance at the angle to determine a location of a point.

6. The method of claim 5, wherein the distance is based on a difference in time between when a beam is transmitted and when the beam is received.

7. The method of claim 6, wherein the distance is based on a frequency of the beam.

8. The method of claim 1, further comprising measuring a sound or vibration and determining the second set of points based on the sound or vibration exceeding a certain threshold.

9. The method of claim 1, further comprising repeatedly determining the first set of points until all of the first set of points are static reference points.

10. The method of claim 1, wherein the threshold distance is in a range of one centimeter to ten centimeters.

11. The method of claim 1, further comprising performing an object detection method with a computer vision system of the vehicle to verify the load space of the vehicle has been intruded into, and in response, sending a notification to a mobile device and/or server with a processor of the vehicle.

12. The method of claim 1, further comprising:
   determining, at a third time, a third set of points on the interior surface of the load space of the vehicle, wherein the third set of points includes a second set of dynamic points that are determined with respect to the static reference points; and
   determining that the second set of dynamic points is associated with the cluster.

13. A system, comprising:
a vehicle, comprising:
a load space and a radar disposed in the load space of the vehicle;
a processor; and
a memory comprising instructions that, when executed by the processor, cause the processor to perform operations comprising:
determining, with the radar at a first time, a first set of points on an interior surface of the space of the vehicle with the radar, wherein the radar generates a point cloud representing the interior surface of the load space, wherein the first set of points includes static reference points;
determining, with the radar at a second time, a second set of points on the interior surface of the space of the vehicle, wherein the second set of points includes a first set of dynamic points that are determined with respect to the static reference points; and
identifying, based on the first set of dynamic points being within a threshold distance of one another, the first set of dynamic points as a cluster, thereby indicating an intrusion into the load space without deformation of any body panels of the vehicle.

14. The system of claim 13, wherein the radar includes a transmitter and a receiver, wherein the transmitter transmits a beam with a band of frequencies at an angle and the receiver receives a reflected beam, wherein a point location includes an angle and a distance, and a first dynamic point has a same angle as a first static reference point and a different distance than the first static reference point.

15. The system of claim 13, further comprising a sensor array; and the instructions that, when executed by the processor, cause the processor to perform operations comprising: measuring a sound or vibration with the sensor array and determining the second set of points if the sound or vibration exceeds a certain threshold.

16. The system of claim 13, further comprising a mobile device or a server; and the instructions that, when executed by the processor, cause the processor to perform operations comprising: sending a notification to at least one of the mobile device and the server in response to a threat indicated by the cluster.

17. The system of claim 13, further comprising a computer vision; and the instructions that, when executed by the processor, cause the processor to perform operations comprising: performing an object detection method with a computer vision system to verify a threat indicated by the cluster.

18. The system of claim 13, further comprising instructions that, when executed by the processor, cause the processor to perform operations comprising:

determining, at a third time, a third set of points on the interior surface of the space of the vehicle, wherein the third set of points includes a second set of dynamic points that are determined with respect to the static reference points; and determining that the second set of dynamic points is associated with the cluster.

19. A method, comprising:

determining, at a first time, a first set of points on an interior surface of a load space of a vehicle with a radar of the vehicle which is disposed in the load space, wherein the radar generates a point cloud representing the interior surface of the load space, wherein the first set of points includes static reference points;

measuring a sound or vibration in the load space and either: a) initiating the radar to determine, at a second time, a second set of points on the interior surface of the load space of the vehicle responsive to the sound or vibration exceeding a certain threshold, wherein the second set of points includes a first set of dynamic points that are determined with respect to the static reference points, or b) keeping the radar dormant responsive to the sound or vibration being below the certain threshold; and if the sound or vibration exceeds the certain threshold, identifying, based on the first set of dynamic points being within a threshold distance of one another, the first set of dynamic points as a cluster, thereby indicating an intrusion into the load space without deformation of any body panels of the vehicle.

\* \* \* \* \*